UNITED STATES PATENT OFFICE.

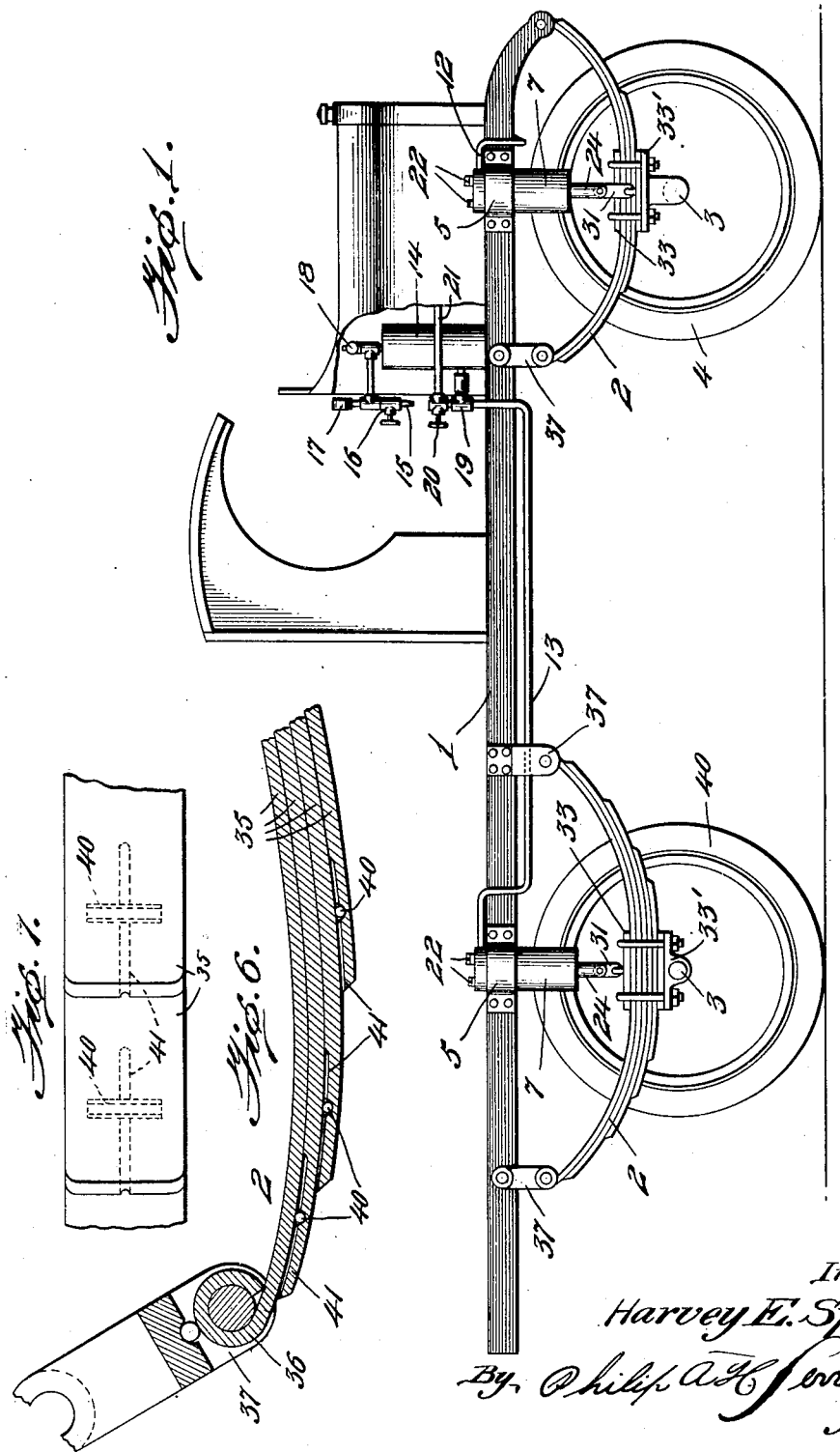

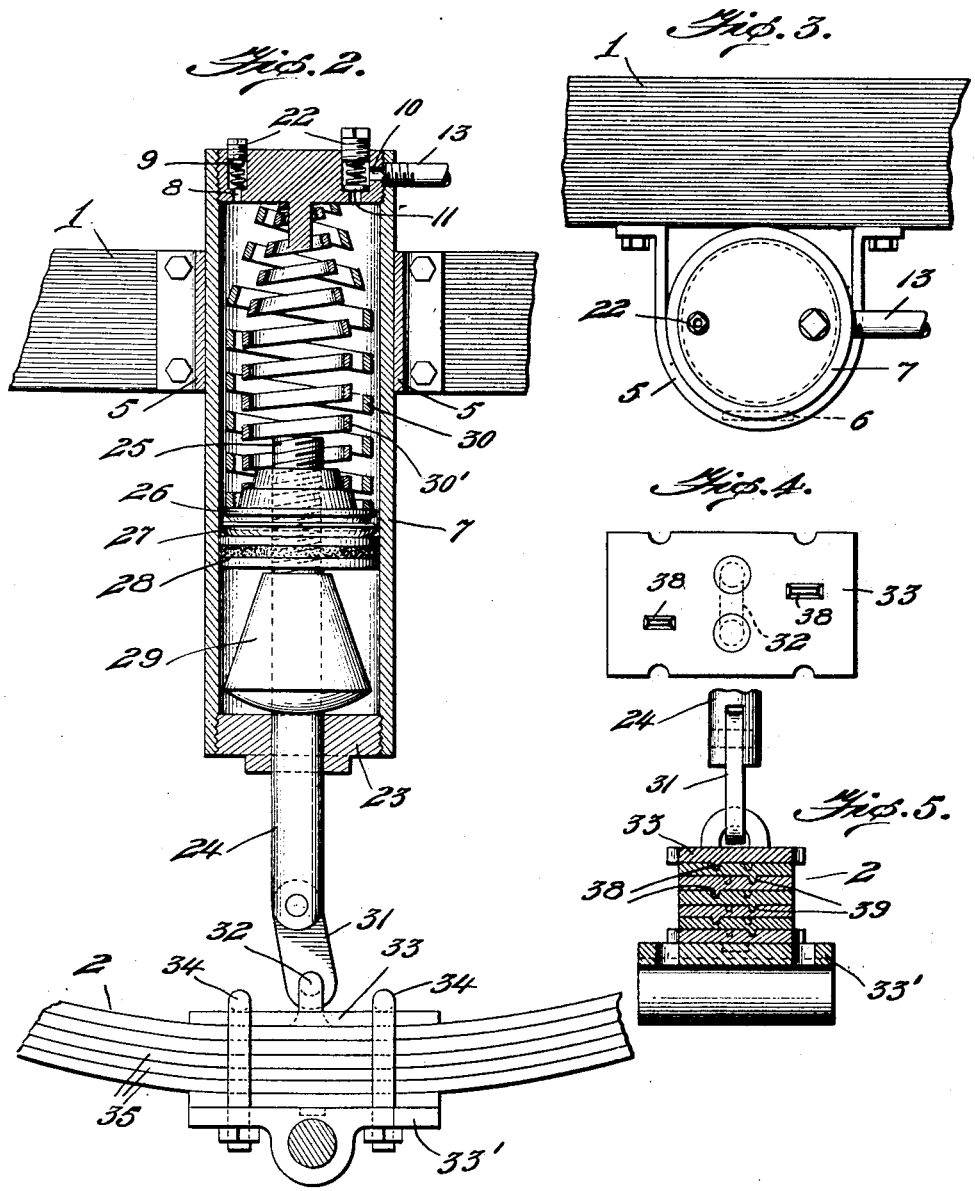

HARVEY E. SPANGLER, OF BUFFALO, NEW YORK.

SHOCK-ABSORBER.

1,371,123. Specification of Letters Patent. Patented Mar. 8, 1921.

Application filed January 27, 1919. Serial No. 273,392.

*To all whom it may concern:*

Be it known that I, HARVEY E. SPANGLER, a citizen of the United States, residing at Buffalo, in the county of Erie and State of New York, have invented certain new and useful Improvements in Shock-Absorbers, of which the following is a specification.

My invention relates to improvements in shock absorbers, the improvements being particularly directed to the construction of the spring structure between the chassis and also of the vehicle.

One object of my invention is the provision of means which will provide a perfect cushion or sprirng and which will provide a shock absorber.

Another object of my invention is the provision of means which will provide a supporting spring and cushioning means which will completely absorb the shock and which will supply and store air for such purposes as cooling the engine or rod and pumping the tires.

Another object is the production of spring and shock absorbing means which will accommodate the imposed load and distribute it to the spring and absorbing means to insure a smooth and easy riding of the vehicle as well as equalize wear upon the parts of the mechanism.

Another object of my invention is the provision of meritorious means for supporting and securing the springs with reference to the chassis and axles, for permitting proper play of the leaves of the spring and directing the oil between the leaves.

Another object is the production of means of the character and for the purposes stated which will be of simple, strong and durable construction; inexpensive of production; easy of application and removal; and generally efficient and practical.

With the attainment of these and other inherent objects in view, my invention consists in certain features of construction and combination of parts for service substantially as shown, described and claimed herein.

Figure 1 is a side elevation of a motor truck equipped with my improvements.

Fig. 2 is a view on an enlarged scale partly in section and partly in elevation of the shock absorber and part of the spring.

Fig. 3 is a top plan view of one of the clamping yokes for securing the casings in which the shock absorbing means are mounted.

Figs. 4 and 5 are detail views showing the means for clamping and returning the leaves of the springs.

Figs. 6 and 7 are detail views showing the means for oiling and supporting the leaves of the springs.

Referring by numeral to the drawings, in which the same numerals are used to designate similar parts in all the views:

The numeral 1 designates the chassis; 2, the supporting springs; 3, the axles; and 4 the wheels of a motor vehicle equipped with my invention, it being understood that my improvements may be used upon any character of vehicle where they would perform their functions.

To the front and rear of the chassis are secured the yokes 5, in which fit and are secured by the keys or wedges 6 the tubular casings 7, each having in its top the air inlet 8 controlled by the inwardly opening spring valve 9, and the outlet 10 controlled by the outwardly opening spring valve 11, the outlets of the casings communicating the forward outlets with pipes 12 for supplying air to cool the radiator of the vehicle, and the rear outlets being connected with the pipes 13, leading to the storage tank 14. The storage tank is provided with a connection 15 for supplying air to fill the tires, such connection having a cock 16, gage 17 and safety device 18. The storage supply connection 19 is provided with a regulating cock 20 and with a branch 21 for furnishing air to cool the engine.

The air inlets and outlets are controlled by the threaded plugs 22, which by their adjustment serve to regulate the spring valves.

The construction described refers to the air storage means and connections and to the four casings to receive and feed the air, the lower portion of these casings is closed by threaded disks 23, in which fits and moves the rods 24, whose upper ends 25 are threaded to engage the stepped cap 26, the flexible washer 27 and the air compressing plunger 28, between which and the disks 23 are placed the elastic buffers or cushions 29, which prevent sudden bumps or jars, and the stepped caps 26 form the seat for the lower ends of the outer coiled spring 30 and the inner or inclosed coil spring 30', whose upper ends bear upon the upper closing caps of the casings.

This construction forms a cushion or shock absorbing means and also the movement of the plungers is cushioned and regulated by the springs and buffers and its action serves to draw the air into the casings and force it out through the outlet pipes to the storage tank.

The lower exposed ends of the plunger rods are connected by pivoted links 31 with the eyes 32 on the cap plates 33, between which and the lower clamping plates 33', secured to the axles, are clamped, by means of the yokes 34, the leaves 35, which constitute the main suspension of supporting springs having their ends 36 secured to the chassis by a proper connection 37.

To secure the leaves of the spring from lateral or sidewise play the leaves at their opposite faces and midway thereof are provided with the lugs 38 and the receiving sockets 39, most clearly shown in Figs. 4 and 5, while between the leaves of the springs are the rollers 40, and the oil ducts 41, to direct oil to the rollers and between the leaves, which insures proper play and lubrication of the leaves of the springs.

The many advantages of my improvements will be readily understood and appreciated from the drawings and description, and it will be apparent that simple, durable and practical means are provided for supplying and storing air for necessary purposes; for absorbing the shocks and jars; for providing the proper spring connections and support; for proper equalization and distribution of support, cushion and wear; for securing, guiding and lubricating the leaves of the springs; and generally insuring an efficient and practical means for attaining all the objects of the invention.

I claim:

1. In a shock absorber, the combination of a chassis, a spring beneath the same, a casing secured to the chassis, a piston for the casing, a piston rod connected with the spring, a spring adapted to force the piston and rod outward, a storage tank for compressed air, a pipe connecting the inner end of the casing with the tank, an outwardly yielding valve in the casing near the inner end of the pipe, an inwardly opening valve in the casing, and a safety outlet on the tank.

2. In a shock absorber, the combination of a chassis, a leaf spring depending from the same, a closed casing secured to the chassis, a piston with packing adapted to play in the casing, a piston rod with link secured to the spring, a spring under compression at the other side of the piston, spring pressed inlet and outlet valves, a compressed air tank carried by the chassis, a pipe from the outlet valve and communicating with the tank, a safety valve on the tank, and an outlet valve.

3. In a shock absorber, the combination of a vehicle frame, an axle, a spring interposed between the axle and the frame, a casing, a piston rod playing in the head of the casing and actuated by the movement of the frame, a stepped piston within the casing, inlet and outlet valves at the bottom of the casing, a tapering spiral spring between the piston and the bottom of the casing, a second and similar spring within the first, and a buffer on the other side of the piston.

4. In a shock absorber, the combination of a vehicle frame, an axle adapted to carry wheels, a spring, a cylinder secured to the frame, a head for the same and having an inlet and outlet valve and a centering stud, a piston with shoulders of various diameters, an inner coiled spring tapered at its top to fit the stud and the smaller shoulder, an outer similar coiled spring fitting at its lower end on a larger shoulder, a piston rod playing through an opposite head, a buffer about the piston rod, and a link connecting the said rod with the axle and spring.

In testimony whereof I affix my signature in the presence of two witnesses.

HARVEY E. SPANGLER.

Witnesses:
ANNA FURSTNER.
WM. C. T. SUOR.